(12) United States Patent
Lee

(10) Patent No.: US 8,909,789 B2
(45) Date of Patent: Dec. 9, 2014

(54) PROVIDING PUSH TO ALL (PTA) SERVICE

(75) Inventor: Jin-Suk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1400 days.

(21) Appl. No.: 11/581,391

(22) Filed: Oct. 17, 2006

(65) Prior Publication Data

US 2007/0200915 A1 Aug. 30, 2007

(30) Foreign Application Priority Data

Feb. 13, 2006 (KR) .......................... 10-2006-0013895

(51) Int. Cl.
| | |
|---|---|
| *G06F 15/16* | (2006.01) |
| *H04L 29/06* | (2006.01) |
| *H04W 84/08* | (2009.01) |
| *H04W 76/00* | (2009.01) |
| *H04W 4/10* | (2009.01) |

(52) U.S. Cl.
CPC .............. *H04W 4/10* (2013.01); *H04L 65/4061* (2013.01); *H04L 65/80* (2013.01); *H04W 84/08* (2013.01); *H04L 65/1006* (2013.01); *H04L 65/1016* (2013.01); *H04W 76/005* (2013.01)
USPC ........... 709/227; 709/203; 709/204; 709/206; 709/225; 709/230

(58) Field of Classification Search
USPC ......... 709/206, 207, 228, 229, 203, 225, 227, 709/204, 230; 455/73
See application file for complete search history.

(56) References Cited

U.S. PATENT DOCUMENTS

| | | | | |
|---|---|---|---|---|
| 6,405,254 B1 * | 6/2002 | Hadland | ....................... | 709/230 |
| 6,714,987 B1 * | 3/2004 | Amin et al. | ................... | 709/249 |
| 7,062,253 B2 * | 6/2006 | Money et al. | ................. | 455/406 |
| 7,177,641 B1 * | 2/2007 | Miernik et al. | ............ | 455/435.1 |
| 7,191,233 B2 * | 3/2007 | Miller | ........................... | 709/227 |
| 7,213,054 B2 * | 5/2007 | Evans et al. | ................... | 709/213 |
| 7,277,945 B1 * | 10/2007 | Shah et al. | ..................... | 709/226 |
| 7,340,523 B2 * | 3/2008 | Van Dyke et al. | ............ | 709/227 |
| 7,359,726 B2 * | 4/2008 | Choksi | .......................... | 455/519 |
| 7,593,359 B2 * | 9/2009 | Eneroth et al. | ................ | 370/312 |

(Continued)

FOREIGN PATENT DOCUMENTS

| | | |
|---|---|---|
| DE | 102004005720 | 8/2005 |
| WO | WO 2005/043944 | 5/2005 |

OTHER PUBLICATIONS

European Search Report corresponding to European Patent Application No. 06023242.8, issued on Jan. 10, 2007.

(Continued)

*Primary Examiner* — Michael Y Won
(74) *Attorney, Agent, or Firm* — H.C. Park & Associates, PLC

(57) ABSTRACT

A system and method of providing a Push To All (PTA) service enables a PTA service terminal having limited resources to efficiently perform a multi session, while performing a PTA service such as Push To Talk (PTT), Push To Video (PTV) or Message Session Relay Protocol (MSRP) with a second PTA terminal via an already established session, by rejecting another session requested by a third terminal upon a service type of the session being the same as a service type of the already established session, and by accepting the session upon the service type of the session being different from the already established session.

16 Claims, 6 Drawing Sheets

(56) References Cited

U.S. PATENT DOCUMENTS

| | | | |
|---|---|---|---|
| 7,657,632 B2* | 2/2010 | Nakao et al. | 709/227 |
| 7,676,582 B2* | 3/2010 | Schmieder | 709/227 |
| 7,716,337 B2* | 5/2010 | Yamakawa et al. | 709/227 |
| 7,738,442 B2* | 6/2010 | Miyamoto et al. | 370/351 |
| 7,774,011 B2* | 8/2010 | Sung et al. | 455/518 |
| 7,783,735 B1* | 8/2010 | Sebes et al. | 709/223 |
| 7,886,063 B2* | 2/2011 | Huh et al. | 709/228 |
| 7,900,140 B2* | 3/2011 | Mohammed et al. | 715/249 |
| 7,979,564 B2* | 7/2011 | Breau et al. | 709/228 |
| 8,023,979 B2* | 9/2011 | Sung et al. | 455/518 |
| 8,036,189 B2* | 10/2011 | Hirano et al. | 370/338 |
| 8,117,318 B2* | 2/2012 | Odakura | 709/227 |
| 8,135,845 B2* | 3/2012 | Lee et al. | 709/227 |
| 8,150,437 B2* | 4/2012 | Choksi | 455/518 |
| 8,180,722 B2* | 5/2012 | John et al. | 706/48 |
| 8,417,786 B2* | 4/2013 | Colbert et al. | 709/206 |
| 8,578,076 B2* | 11/2013 | van der Linden et al. | 710/72 |
| 8,606,899 B1* | 12/2013 | Ryner et al. | 709/223 |
| 2002/0036982 A1* | 3/2002 | Chen | 370/230 |
| 2003/0055977 A1* | 3/2003 | Miller | 709/227 |
| 2003/0177245 A1* | 9/2003 | Hansen | 709/228 |
| 2004/0120474 A1* | 6/2004 | Lopponen et al. | 379/88.17 |
| 2005/0135428 A1* | 6/2005 | Hellgren | 370/481 |
| 2005/0213580 A1* | 9/2005 | Mayer et al. | 370/395.2 |
| 2005/0243754 A1* | 11/2005 | Saeed et al. | 370/328 |
| 2006/0195593 A1* | 8/2006 | Shiraki et al. | 709/227 |
| 2006/0211450 A1* | 9/2006 | Niekerk et al. | 455/558 |
| 2006/0234745 A1* | 10/2006 | Park et al. | 455/518 |
| 2006/0248180 A1* | 11/2006 | Bernardi et al. | 709/223 |
| 2006/0293073 A1* | 12/2006 | Rengaraju et al. | 455/518 |
| 2007/0022200 A1* | 1/2007 | Benkert et al. | 709/227 |
| 2007/0027993 A1* | 2/2007 | Schwagmann et al. | 709/227 |
| 2007/0094337 A1* | 4/2007 | Klassen et al. | 709/206 |
| 2007/0100908 A1* | 5/2007 | Jain et al. | 707/204 |
| 2007/0200915 A1* | 8/2007 | Lee | 348/14.01 |
| 2008/0049741 A1* | 2/2008 | Wirtanen et al. | 370/389 |
| 2009/0279455 A1* | 11/2009 | Wang et al. | 370/260 |
| 2010/0146066 A1* | 6/2010 | Bian et al. | 709/206 |
| 2010/0246535 A1* | 9/2010 | Lindner | 370/332 |

OTHER PUBLICATIONS

Open Mobile Alliance (OMA): *Push to Talk Over Cellular (PoC)-Architecture*. Draft Version 2.0—Jan. 30, 2006.

Schulke, et al. *ESS Handling Concept*. OMA POC V2 Documents, Jan. 25, 2006.

* cited by examiner

FIG. 2

```
INVITE sip:adhoc@imstesta1.com SIP/2.0
From: <sip:solomon2@imstesta1.com>;tag=2b6230-7b0a10ac-13c4-4a1-33b523c0-4a1
To: <sip:adhoc@imstesta1.com>
Call-ID: 2cd468-7b0a10ac-13c4-4a1-3f82fcfb-4a1@imstesta1.com
CSeq: 1 INVITE
Via: SIP/2.0/UDP 172.16.10.123:5060;branch=z9hG4bK-4a1-1215e0-5d4b1f49
Accept-Contact: *;+g.poc.talkburst;require;explicit
Route: <sip:165.213.107.14:5080;lr>
Mime-Version: 1.0
Max-Forwards: 70
Supported: timer
P-Preferred-Identity: <sip:solomon2@imstesta1.com>
User-Agent: PoC-clinet/OMA1.0
Contact: <sip:172.16.10.123:5060>
Session-Expires: 1800
Content-Type: multipart/mixed;boundary=++
Content-Length: 692

--++
Content-Type: application/sdp
Content-Length: 310 v=0
o=- 0 0 IN IP4 172.16.10.123
s=-
c=IN IP4 172.16.10.123
t=0 0
a<m=audio>49648 RTP/AVP 0 8
   a=rtpmap:0 PCMU/8000
   a=rtpmap:8 PCMA/8000
   a=sendrecv
b<m=video>49650 RTP/AVP 34 31
   a=rtpmap:34 H263/90000
   a=rtpmap:31 H261/90000
   m=application 49651 udp TBCP
   a=fmtp:TBCP tb_priority=3;timestamp=1;queuing=1

--++
Content-Type: application/resource-lists+xml
Content-Length: 237

<?xml version="1.0" encoding="UTF-8"?>
<resource-lists xmlns="urn:ietf:params:xml:ns:resource-lists"
xmlns:xsi="http://www.w3.org/2001/XMLSchema-instance">
<list>
<entry uri="sip:solomon1@imstesta1.com"/>
</list>
</resource-lists>

```
INVITE sip:172.16.10.123:5060 SIP/2.0
From: anonymous <sip:anonymous@anonymous.invalid>;tag=20-12-2-IMN1
To: <sip:solomon2@imstesta1.com>
Call-ID: 142601203-ri-20-12-2IMN1
CSeq: 8388 INVITE
Via: SIP/2.0/UDP 165.213.107.14:5080;branch=z9hG4bK15dd_1.2.2.16.21774.2.
Via: SIP/2.0/UDP 165.213.107.14:5070;branch=z9hG4bK15dc_2.0.2.16.21773.6.
Via: SIP/2.0/UDP 165.213.107.14:5070;branch=z9hG4bK15db_2.0.1.16.21773.5.
Via: SIP/2.0/UDP 172.16.10.112:5070;branch=z9hG4bK-proxyModeres1659801429
Via: SIP/2.0/UDP 165.213.107.14:5070;branch=z9hG4bK15da_2.0.1.16.21773.2.
Via: SIP/2.0/UDP 165.213.107.14:5070;branch=z9hG4bK15d9_2.1.2.16.21772.6.
Via: SIP/2.0/UDP 165.213.107.14:5070;branch=z9hG4bK15d8_2.0.1.16.21772.5.
Via: SIP/2.0/UDP 172.16.10.112:5070;branch=z9hG4bK-ri-20-12-2-297333756
Contact: <sip:12.1.1853806020@172.16.10.112:5070>
Supported: timer
Max-Forwards: 66
P-Called-Party-ID: <sip:solomon2@imstesta1.com:5060>
User-Agent: IM-serv
Accept-Contact: *;+g.im.conference=TRUE
Referred-By: <sip:solomon3@imstesta1.com>
Record-Route: <sip:1.2.2.16.21774.2.@165.213.107.14:5080;lr>
Record-Route: <sip:1.2.2.16.21774.0.@165.213.107.14:5080;lr>
Record-Route: <sip:2.0.2.16.21773.6.@165.213.107.14:5070;lr>
Record-Route: <sip:2.0.1.16.21773.5.@165.213.107.14:5070;lr>
Record-Route: <sip:2.0.1.16.21773.2.@165.213.107.14:5070;lr>
Record-Route: <sip:2.0.2.16.21773.0.@165.213.107.14:5070;lr>
Record-Route: <sip:2.1.2.16.21772.6.@165.213.107.14:5070;lr>
Record-Route: <sip:2.0.1.16.21772.5.@165.213.107.14:5070;lr>
Session-Expires: 90;refresher=uas
Content-Type: application/sdp
Content-Length: 180 v=0
o=- 0 0 IN IP4 172.16.10.112
s=-
c=IN IP4 172.16.10.112
t=0 0
C< m=message>9999 msrp/tcp *
   a=accept-types:text/plain
   a=path:msrps://172.16.10.114:19200/ims-11-0-2-ims;tcp
```

PROVIDING PUSH TO ALL (PTA) SERVICE

CLAIM OF PRIORITY

This application makes reference to, incorporates the same herein, and claims all benefits accruing under 35 U.S.C. §119 from an application for SYSTEM AND METHOD FOR PROVIDING PTA SERVICE earlier filed in the Korean Intellectual Property Office on the 13 Feb. 2006 and there duly assigned Serial No. 10-2006-0013895.

BACKGROUND OF THE INVENTION

1. Field of the Invention

The present invention relates to a system and method of providing a Push To All (PTA) service.

2. Description of the Related Art

A Push To All (PTA) service based on an IP-based Multimedia Subsystem (IMS) includes a Push To Talk (PTT) service providing only a voice service, a Push To Video (PTV) service providing voice and image services, and a Message Session Relay Protocol (MSRP) service providing Short Message Service (SMS) or binary data service.

The PTA is based on Session Initiation Protocol (SIP), which is a text-based application level protocol, and SIP is adopted by many systems due to its simple structure and excellent extendibility compared to other protocols. Literally, the SIP is a signaling protocol used to connect a session. The SIP can be used in a video telephone call, multimedia, connecting to an online game, etc., in addition to an Internet telephone call. RFC 2543 is a first version of an RFC that was adopted as a standard, and has been updated to RFC 3261.

When a PTA service subscriber wants to communicate with a counterpart, the subscriber selects the counterpart to invite, generates an invitation message in SIP format, and transmits the message to a server by selecting a call button or a service start button on a PTA terminal. According to this process, a session is created by the server, and the PTA subscriber participates in a PTA session such as PTT, PTV, MSRP, etc.

When another subscriber out of the PTA session requests a called subscriber, whose line is busy due to participation in the PTA session, to accept another PTA session, the server informs the called subscriber of this request, and then receives a response indicating an intention to participate in the other PTA session, thereby enabling the called subscriber to participate in two PTA talk sessions simultaneously. In other word, the PTA service provides a multi session.

The PTA service allows each PTA terminal subscriber to be provided with the multi-session after each PTA terminal subscriber registers information in advance as to whether to accept the multi session with the server.

The PTA service allows "Call-Lag" multiple management to be performed by the SIP used by the PTA service to provide the multi session.

Consequently, terminals such as mobiles, PDAs, etc., providing the PTA service perform "Call-Lag" multiple management and have limited resources left over to provide the multi session.

SUMMARY OF THE INVENTION

It is an object of the present invention to provide a system and method of providing a Push To All (PTA) service, capable of providing various multi services using a terminal having limited resources in the PTA service.

According to one aspect of the present invention, a system providing a Push To All (PTA) service is provided, the system including: at least one terminal and another terminal, the at least one terminal adapted to transmit a session rejection message to another terminal upon a service type of a session request message received from the another terminal being the same as a service type of an established first session, and to establish a second session with the another terminal upon the service type of the received session request message being different from the service type of the first session.

The service type of the first session is preferably either a Push To Talk (PTT) service or a Push To Video (PTV) service. The service type of the second session is preferably a Message Session Relay Protocol (MSRP) service.

The session request message preferably includes at least one PTA service type of Push To Talk (PTT), Push To Video (PTV) or Message Session Relay Protocol (MSRP) to establish a session with the at least one terminal.

The at least one terminal is preferably adapted to output session request message reception information and information on requesting a response indicating whether the session is accepted to a user upon the service type of the session request message received from the another terminal is different from the service type of the first session, and to establish the second session by receiving information on accepting the session from the user and transmitting a session acceptance message to the another terminal. The at least one terminal is preferably adapted to transmit a session rejection message to the another terminal not to establish the second session upon session rejection information being input by the user.

The at least one terminal preferably includes: a transceiver adapted to transmit and receive PTA service messages to and from the another terminal; and a controller adapted to facilitate the session rejection message being provided to the another terminal upon the service type of the session request message received by the transceiver being the same as the service type of the first session, and to facilitate the session acceptance message being provided to the another terminal to establish the second session with the another terminal upon the service type of the received message being different from the service type of the first session.

According to another aspect of the present invention, a terminal providing a Push To All (PTA) service is provided, the terminal including: a transceiver adapted to transmit and receive PTA service messages to and from another terminal; and a controller adapted to facilitate a session rejection message being provided to the another terminal upon a service type of a session request message received by the transceiver being the same as a service type of an established session, and to facilitate establishing another session with the another terminal using a service type of the session request message upon the service type of the message received being different from the service type of the established session.

According to still another aspect of the present invention, a method of providing a Push To All (PTA) service to at least one terminal is provided, the method including: receiving a session request message at a terminal with which a first session has been established, the session request message being from another terminal with which the first session has not been established; comparing a service type of the received session request message with a service type of the first session at the terminal; the terminal transmitting a session rejection message to the another terminal upon the service type of the received session request message being the same as the service type of the first session; and the terminal establishing a second session with the another terminal upon the service type of the received session request message being different from the service type of the first session.

The type of service of the first session is preferably either a Push To Talk (PTT) service or a Push To Video (PTV) service. The type of service of the second session is preferably a Message Session Relay Protocol (MSRP) service.

The session request message preferably includes at least one PTA service type of Push To Talk (PTT), Push To Video (PTV) or Message Session Relay Protocol (MSRP) to establish a session with the terminal.

The terminal establishing the second session with the another terminal preferably includes: the terminal outputting session request message reception information and information on requesting a response indicating whether the session has accepted to a user upon the service type of the received session request message being different from the service type of the first session; transmitting a session acceptance message to the another terminal upon information on accepting the session being input by the user; and transmitting a session rejection message to the another terminal upon information on rejecting the session being input by the user.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein:

FIGS. 2 and 3 are Session Initiation Protocol (SIP) "INVITE" messages according to an exemplary embodiment of the present invention;

DETAILED DESCRIPTION OF THE INVENTION

Hereinafter, exemplary embodiments of the present invention are described in detail with reference to the accompanying drawings. It will be understood by those skilled in the art that various modifications in form and detail can be made to the following exemplary embodiments without departing from the spirit and scope of the present invention as defined by the appended claims.

Figure 1:
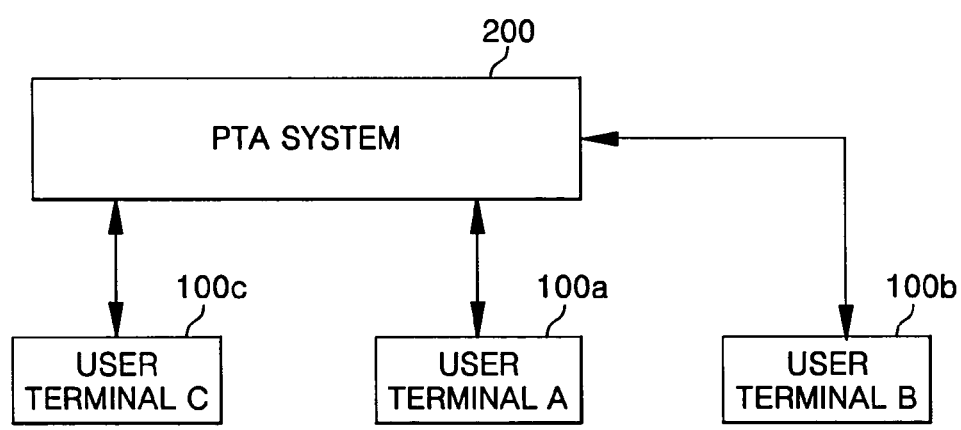
FIG. 1 is a view of a multi session service system in a Push To All (PTA) system according to an exemplary embodiment of the present invention.

FIG. 1 is a view of a multi session service system in a Push To All (PTA) system according to an exemplary embodiment of the present invention.

As illustrated in FIG. 1, a system for providing a PTA service according to an exemplary embodiment of the present invention comprises a PTA system 200 and a plurality of user terminals 100a, 100b, and 100c.

The user terminals 100a, 100b, and 100c are PTA terminals connected to the PTA system 200 to perform a Push To Talk (PTT) service, a Push To Video (PTV) service, and a Message Session Relay Protocol (MSRP) service. In particular, the user terminals 100a, 100b, and 100c support establishment of a multi session by a user through user interfaces.

Among the user terminals 100a, 100b, and 100c, a user terminal A 100a (hereinafter referred to as a "first terminal") is a PTA terminal in the process of performing the PTT, PTV, or MSRP service with a user terminal B 100b (hereinafter referred to as a "second terminal") through a session which has already been created. The first terminal receives a session request message, i.e., an "INVITE" message, from a calling subscriber using a user terminal C 100c (hereinafter referred to as a "third terminal") through the PTA system 200.

The first terminal 100a parses a Session Description Protocol (SDP) included in the transmitted "INVITE" message to determine the type of PTA service session that the third terminal 100c has requested.

FIGS. 2 and 3 are Session Initiation Protocol (SIP) "INVITE" messages according to an exemplary embodiment of the present invention.

As illustrated in FIG. 2, a terminal can determine whether the type of service of a requested session is a PTT service or a PTV service through "m=audio" recorded in a of the SDP in the SIP "INVITE" message or "m=video" recorded in b.

Also, as illustrated in FIG. 3, a terminal can determine whether the type of service of a requested session is an MSRP service through "m=message" recorded in c of the SDP in the SIP "INVITE" message.

Comparing the checked PTA service type with the PTA service type currently being provided, when the service types are the same, the first terminal 100a transmits a message rejecting a requested PTA service session to the PTA system 200 so that the message rejecting the requested PTA service session is provided to the third terminal 100c. The PTA service can authorize the PTT service and the PTV service as the same service.

However, when the checked PTA service type is different from that currently being provided, the first terminal 100a informs a called subscriber, i.e., a user, that a session request has been received, and allows the user to determine whether to accept a multi session.

When the user accepts the multi session, the first terminal 100a transmits a multi session acceptance message to the PTA system so that a new session can be created according to a request of the third terminal 100c.

For example, when the first terminal 100a is in the process of performing the PTT service with the second terminal 100b through a session which has already been created, and receives a request for an MSRP service session from a calling subscriber, i.e., the third terminal 100c, the PTA service system allows the called subscriber, i.e., the user, to determine whether to accept the session, and then generates the session according to the user's decision.

However, the first terminal 100a transmits the session rejection message to the PTA system 200 so as not to generate a session with the third terminal 100c when the PTT or PTV service session has been requested by the calling subscriber, i.e., the third terminal 100c.

Figure 4:
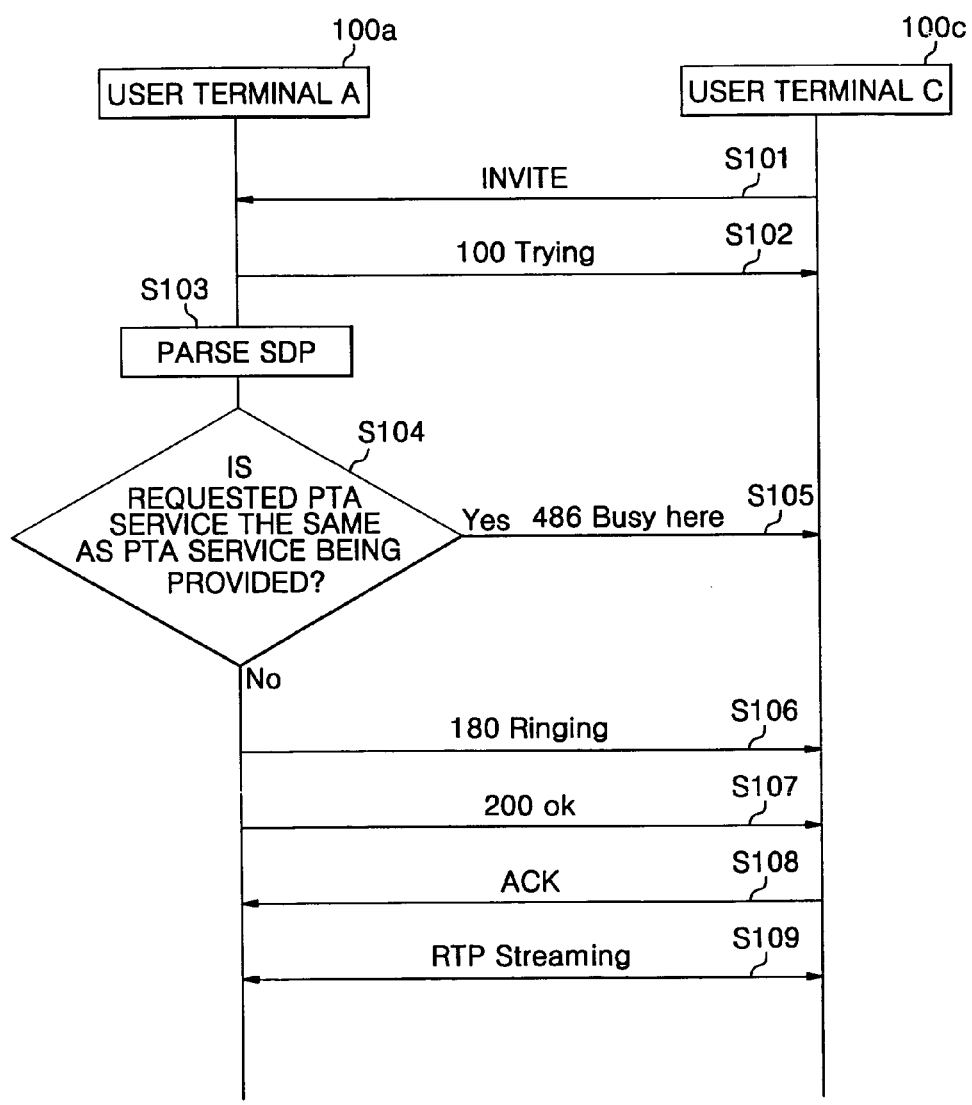
FIG. 4 is a view of a method of providing a PTA service according to an exemplary embodiment of the present invention.

FIG. 4 is a view of a method of providing a PTA service according to an exemplary embodiment of the present invention.

As illustrated in FIG. 4, when a first terminal 100a is in the process of performing a PTT, PTV or MSRP service with a second terminal 100b through an already created session, the first terminal 100a may receive a session request message, i.e., an "INVITE" message, from a third terminal 100c through a PTA system 200 (not shown—a description of a function of the PTA system 200 acting as a relay has been omitted), in S101.

The first terminal 100a transmits a "100 Trying" message to the third terminal 100c when the "INVITE" message has been received from the third terminal 100c, in S102.

The first terminal 100a then parses the SDP included in the received "INVITE" message, and checks the PTA service session type requested by the third terminal, in S103.

Comparing the checked PTA service type with the PTA service type being provided, the first terminal 100a transmits a message to the third terminal 100c indicating that the requested PTA service session has been rejected when both PTA service types are identical, in S104.

For example, the first terminal 100a transmits a "486 Busy Here" message to the third terminal 100c to inform the third terminal 100c that a multi session has been rejected, in S105.

When the checked PTA service type is different from the PTA service type currently being provided, the first terminal 100a informs a called subscriber, i.e., a user, that a session request has been received, and transmits a "180 Ringing" message to the third terminal 100c, in S106.

After the first terminal 100a allows the user to determine whether to accept the multi session, it transmits a multi session acceptance message to the third terminal 100c when the user has accepted the multi session, in S107.

For example, the first terminal 100a transmits a "200 OK" message to the third terminal 100c, thereby informing the third terminal 100c that the multi session has been accepted.

After transmitting the multi session acceptance message, the first terminal 100a receives an ACK message corresponding to the multi session acceptance message from the third terminal 100c, in S108, and performs RTP streaming with the third terminal 100c through a created session, in S109.

Figure 5:
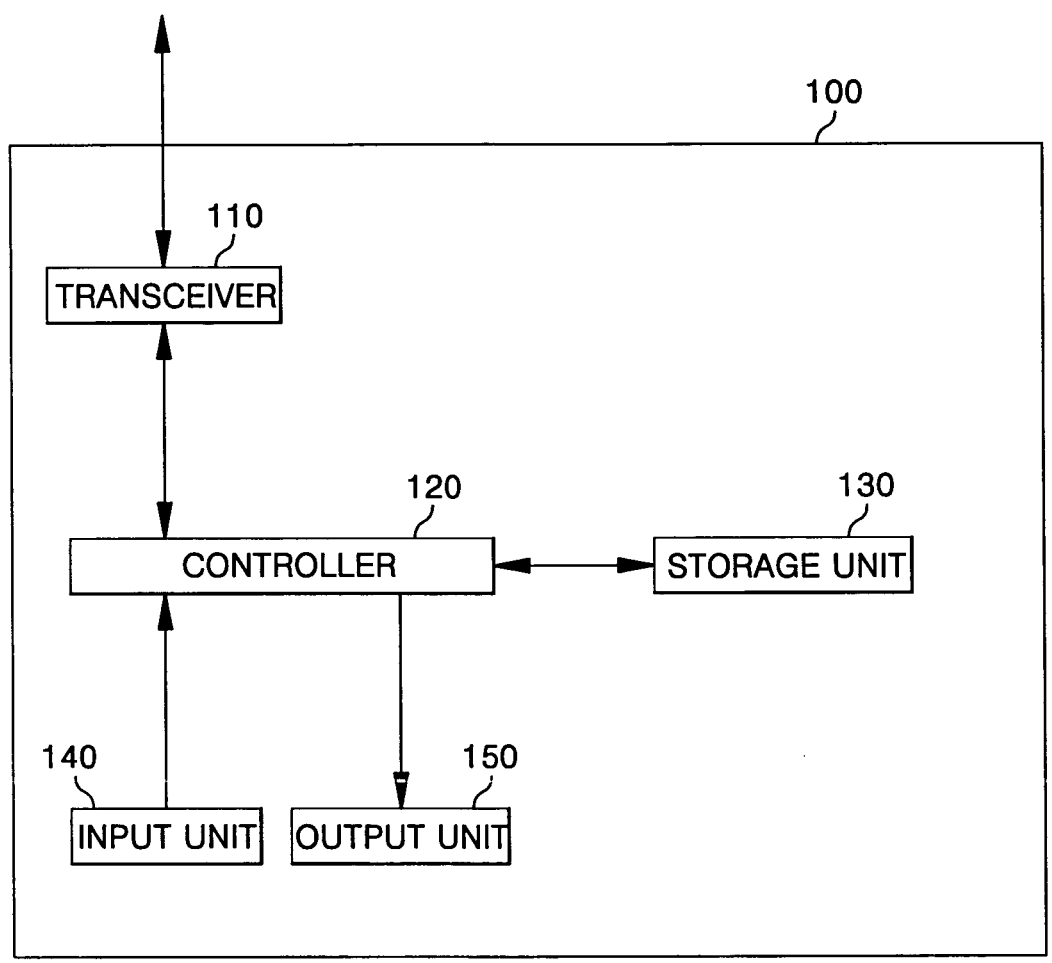
FIG. 5 is a block diagram of a terminal of a PTA subscriber according to an exemplary embodiment of the present invention.

FIG. 5 is a block diagram of a PTA user terminal according to an exemplary embodiment of the present invention.

As illustrated in FIG. 5, the PTA user terminal 100 includes a transceiver 110, a controller 120, a storage unit 130, an input unit 140, and an output unit 150.

The transceiver 110 transmits and receives a PTT, PTV or MSRP service message to/from a PTA system 200.

The controller 120 parses and processes the PTT, PTV or MSRP service message received through the transceiver 110, and controls all of the functions of the terminal.

The storage unit 130 stores information on a service type being provided to the terminal, and information on a received message.

The input unit 140 receives information from a user as to acceptance or rejection of a multi session.

The output unit 150 provides information on requesting a response as to whether to accept the multi session and multi session request message reception information to a user through a speaker or a display.

Figure 6:
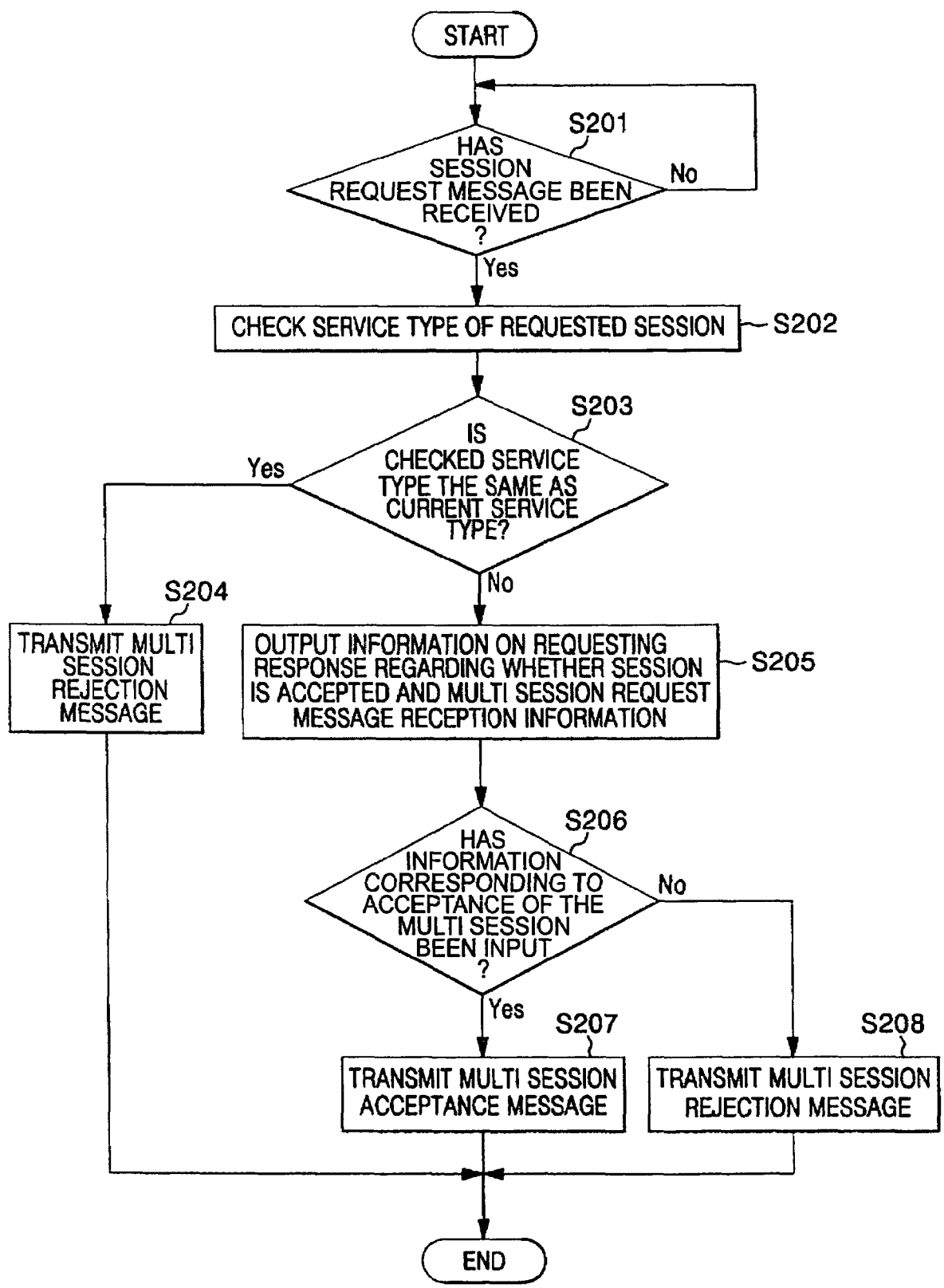
FIG. 6 is a flowchart of a method of providing a PTA service according to an exemplary embodiment of the present invention.

FIG. 6 is a flowchart of a method of providing a PTA service according to an exemplary embodiment of the present invention.

As illustrated in FIG. 6, a terminal 100a performing a PTT, PTV or MSRP service with a second terminal 100b through a session which has already been created, determines whether a session request message has been received from a third terminal 100c, in S201.

When the session request message has been received from the third terminal 100c, the terminal 100a parses the received message and checks a service type of a requested session, in S202.

The terminal 100a checks whether the parsed PTA service type is the same service type as a PTA service type currently being provided with the second terminal 100b, in S203.

When it is determined that the checked PTA service type is not different from the PTA service type currently being provided, the terminal 100a transmits a multi session rejection message to the third terminal 100c, in S204.

However, when it is determined that the checked PTA service type is not the same as the PTA service type currently being provided, the terminal 100a outputs information on requesting a response to whether to accept the multi session and the multi session request message reception information, and receives information corresponding to the output information from the user, in S205, S206.

The terminal 100a transmits a multi session acceptance message to the third terminal 100c when information corresponding to acceptance of the multi session has been input by the user, in S207, and transmits the multi session rejection message to the third terminal 100c when information corresponding to rejection of the multi session has been input by the user, in S208.

As described above, a system and method of providing a PTA service in accordance with the present invention enable a PTA service terminal having limited resources to efficiently perform a multi session by rejecting a session requested by a third terminal, while performing a PTA service such as PTT, PTV or MSRP with a second PTA terminal through a session in progress, when a service type of the session is the same as a service type of the session already in progress, and by accepting the session when the service type is different from the session already in progress.

While the present invention has been described with reference to exemplary embodiments thereof, it will be understood by those skilled in the art that various modifications in form and detail can be made therein without departing from the scope of the present invention as defined by the following claims.

What is claimed is:

1. A user terminal, comprising:
a transceiver to transmit and receive multi-session service messages to and from another terminal; and
a controller to analyze a session request message, received by the transceiver from a first terminal, to establish a new session with the user terminal, the new session being established with the user terminal based on an input from the user terminal and that a service type of the session request message is different from a service type of an established session,
wherein the session request message comprises at least one service type of Push To Talk (PTT), Push To Video (PTV), and Message Session Relay Protocol (MSRP) for establishing a session with the user terminal.

2. The user terminal of claim 1, the user terminal further comprising:
a storage unit to store information on a service type being provided to the user terminal, and information on a received message;
an input unit to receive information from the user according to acceptance or rejection of a multi-session; and
an output unit to provide information on requesting a response regarding whether to accept the multi-session, and multi-session request message reception information to the user.

3. The user terminal of claim 2, wherein the output unit comprises at least one of a speaker or a display device.

4. The user terminal of claim 1, wherein the controller is configured to generate a session rejection message when the input comprises a rejection of the session request message.

5. The user terminal of claim 1, wherein the multi-session service message comprises a Push to All (PTA) service message.

6. The user terminal of claim 5, wherein the first terminal comprises a terminal configured to request establishment of a session with the user terminal, and wherein the second terminal comprises a terminal configured to perform a PTA service with the user terminal.

7. The user terminal of claim 1, wherein the controller is configured to transmit a session rejection message to the first terminal based on determining that the service type of the session request message is identical to the service type of the established session.

8. The user terminal of claim 1, wherein the controller is further configured to perform a first service with the second terminal through a first session between the user terminal and the second terminal.

9. A method of providing a multi-session service at a user terminal, the method comprising:
  receiving a session request message for establishing a new session with the user terminal from a first terminal;
  determining whether a service type of the session request message is different from a service type of an established session between the user terminal and a second terminal; and
  establishing, depending on an input from the user terminal, the new session with the first terminal based on determining that the service type of the session request message is different from the service type of the established session,
  wherein the session request message comprises at least one service type of Push To Talk (PTT), Push To Video (PTV), and Message Session Relay Protocol (MSRP) for establishing a session with the user terminal.

10. The method of claim 9, wherein establishing further comprises:
  outputting session request message reception information and information on requesting a response indicating whether the new session is accepted to a user based on a determination that the service type of the session request message is different from the service type of the established session;
  transmitting a session acceptance message to the first terminal and establishing the new session with the first terminal based on the service type of the session request message based on a determination that information on accepting the new session is input by the user; and
  transmitting a session rejection message to the first terminal based on a determination that information on rejecting the new session is input by the user.

11. The method of claim 9, further comprising:
  transmitting a session rejection message to the first terminal based on determining that the service type of the session request message is identical to the service type of the established session.

12. The method of claim 9, further comprising performing a first service with the second terminal through a first session before receiving the session request message.

13. A method of providing a multi-session service at a user terminal, the method comprising:
  receiving a session request message for establishing a new session with the user terminal from a first terminal;
  determining whether a service type of the session request message is identical to a service type of an established session between the user terminal and a second terminal;
  determining whether to reject the session request message based on an input from the user terminal;
  transmitting a session rejection message to the first terminal based on a determination to reject the session request message; and
  establishing the new session with the first terminal based on the input from the user terminal and a determination that the service type of the session request message is different from the service type of the established session,
  wherein the session request message comprises at least one service type of Push To Talk (PTT), Push To Video (PTV), and Message Session Relay Protocol (MSRP) for establishing a session with the user terminal.

14. The method of claim 13, further comprising performing a first service with the second terminal through a first session before receiving the session request message.

15. A user terminal, comprising:
  a transceiver configured to transmit and receive multi-session service messages to and from another terminal; and
  a controller configured to
    determine whether to reject a session request message, received by the transceiver from a first terminal, for establishing a new session with the user terminal based on an input from the user terminal;
    determine whether a service type of the session request message is identical to a service type of an established session between the user terminal and a second terminal;
    to generate a session rejection message for transmission to the first terminal based on a determination to reject the session request message; and
    to establish the new session with the first terminal based on the input from the user terminal and a determination that the service type of the session request message is different from the service type of the established session,
  wherein the session request message comprises at least one service type of Push To Talk (PTT), Push To Video (PTV), and Message Session Relay Protocol (MSRP) for establishing a session with the user terminal.

16. The user terminal of claim 15, wherein the controller is further configured to perform a first service with the second terminal through a first session between the user terminal and the second terminal.

* * * * *